(12) United States Patent
Yang

(10) Patent No.: US 8,717,290 B2
(45) Date of Patent: May 6, 2014

(54) METHOD AND MODULE FOR MODIFYING AN ANGULAR POINTER SIGNAL GENERATED USING THREE DIMENSIONAL POINTING, AND THREE DIMENSIONAL POINTING DEVICE

(76) Inventor: Meng-Ta Yang, Jhubei (TW)

( * ) Notice: Subject to any disclaimer, the term of this patent is extended or adjusted under 35 U.S.C. 154(b) by 364 days.

(21) Appl. No.: 13/238,491

(22) Filed: Sep. 21, 2011

(65) Prior Publication Data

US 2012/0176309 A1    Jul. 12, 2012

(30) Foreign Application Priority Data

Jan. 10, 2011   (TW) .............................. 100100804 A

(51) Int. Cl.
*G06F 3/033*   (2013.01)
(52) U.S. Cl.
USPC .......................................... 345/157; 345/156
(58) Field of Classification Search
CPC ................................ G06F 3/0346; G06F 3/033
USPC .......................................................... 345/156
See application file for complete search history.

(56) References Cited

U.S. PATENT DOCUMENTS

| 2009/0295721 A1* | 12/2009 | Yamamoto et al. | 345/158 |
| 2011/0095979 A1* | 4/2011 | Sheng et al. | 345/158 |
| 2011/0163947 A1* | 7/2011 | Shaw et al. | 345/156 |

* cited by examiner

*Primary Examiner* — Lixi C Simpson
(74) *Attorney, Agent, or Firm* — Rajesh Vallabh; Foley Hoag LLP

(57) ABSTRACT

In a method and module for modifying a pointer signal generated by a 3D point in device and corresponding to motion of the pointing device, an angular velocity generating unit generates an angular velocity of the 3D pointing device based on the pointer signal. A control unit generates a control signal based on the angular velocity generated by the angular velocity generating unit and predetermined angular velocity threshold information. An adjustable low-pass filter is operable within a gain range, and determines a target gain thereof based on the control signal from the control unit. The low-pass filter filters the pointer signal with the target gain determined thereby to generate a modified output corresponding to the pointer signal.

14 Claims, 6 Drawing Sheets

METHOD AND MODULE FOR MODIFYING AN ANGULAR POINTER SIGNAL GENERATED USING THREE DIMENSIONAL POINTING, AND THREE DIMENSIONAL POINTING DEVICE

CROSS-REFERENCE TO RELATED APPLICATION

This application claims priority to Taiwanese Application No. 100100804, filed on Jan. 10, 2011.

BACKGROUND OF THE INVENTION

1. Field of the Invention

The invention relates to a pointing device, and more particularly to a three dimensional pointing device.

2. Description of the Related Art

FIG. 1 illustrates a conventional three dimensional (3D) pointing device 1, such as a 3D mouse, that includes a three-axis accelerometer 11 three-axis magnetometer 12, an angle calculating unit 13, a low-pass filter 14, and a two-axis coordinate converting unit 15. The three-axis accelerometer 11 measures an acceleration value on an X-axis, a Y-axis and a Z-axis of the conventional 3D pointing device 1. During motion of the conventional 3D pointing device, the three-axis magnetometer 12 measures a terrestrial magnetism value on the X-axis, the Y-axis and the Z-axis of the conventional 3D pointing device. The angle calculating unit 13 uses the acceleration value measured in the three-axis accelerometer 11 to calculate a roll angle and a pitch angle of the conventional 3D pointing device 1. Further, the angle calculating unit 13 uses the roll angle, the pitch angle, and the terrestrial magnetism value measured in the three-axis magnetometer 12 to calculate a yaw angle of the conventional 3D pointing device 1. The angle calculating unit 13 subtracts pre-stored initial yaw and pitch angles from the yaw and pitch angles calculated thereby to output an angular pointer signal corresponding to the motion of the conventional 3D pointing devices. The low-pass filter 14 filters out jitter noise, which results from human tremor, from the pointer signal to generate a filtered output. The two-axis coordinate converting unit 15 converts the filtered output from the low-pass filter 14 into an X-Y coordinate output that can serve as an input signal for a computer to control movement of a cursor on a screen of the computer display.

However, the low-pass filter 14 with a fixed bandwidth/gain may filter out the pointer signal corresponding to high-speed motion of the conventional 3D pointing device, thereby resulting in lack of precision. FIG. 2 illustrates an angular velocity (L1') of the conventional 3D pointing device, and a processed angular velocity (L2') obtained from the conventional 3D pointing device. It is noted that the conventional 3D pointing device has a relatively long latency time ($T_L$). Therefore, the conventional 3D pointing device cannot instantaneously generate a pointing output in response to one operation.

SUMMARY OF THE INVENTION

Therefore, an object of the present invention is to provide a method and module for modifying a pointer signal generated using three dimensional pointing, and a three dimensional pointing device that can overcome the aforesaid drawbacks of the prior art.

According to one aspect of the present invention, there is provided a method of modifying an angular pointer signal generated by a handheld pointing device using three dimensional pointing and corresponding to motion of the pointing device. The method comprises the steps of:

a) providing an adjustable low-pass filter operable within a gain range;

b) generating an angular velocity of the pointing device based on the pointer signal;

c) determining a target gain of the adjustable low-pass filter based on the angular velocity and predetermined angular velocity threshold information; and d) filtering the pointer signal using the adjustable low-pass filter with the target gain determined in step c) to generate a modified output corresponding to the pointer signal.

According to another aspect of the present invention, there is provided a module for modifying an angular pointer signal generated by a handheld pointing device using three dimensional pointing and corresponding to motion of the pointing device. The module comprises:

an angular velocity generating unit adapted for receiving the pointer signal from the handheld pointing device to generate en angular velocity of the pointing device;

a control unit coupled to the angular velocity generating unit and receiving the angular velocity from the angular velocity generating unit, the control unit being operable to generate a first control signal based on the angular velocity and predetermined angular velocity threshold information; and an adjustable low-pass filter coupled to the control unit for receiving the first control signal therefrom, and adapted to receive the pointer signal from the pointing device, the adjustable low-pass filter being operable with a gain range and determining a target gain thereof based on the first control signal received thereby, the adjustable low-pass filter filtering the pointer signal with the target gain determined thereby to output a modified output corresponding to the pointer signal.

According to a further aspect of the present invention a three dimensional pointing device comprises:

a three-axis accelerometer for measuring a three dimensional acceleration value of the three dimensional during motion of the three dimensional pointing device to output an acceleration output;

a three-axis magnetometer for measuring a three dimensional, terrestrial magnetism value of the three dimensional during the motion of the three dimensional pointing device to output a terrestrial magnetism output;

an angle calculating unit coupled to the accelerometer and the magnetometer, and configured to receive the acceleration output and the terrestrial magnetism output from the accelerometer and the magnetometer to output an angular pointer signal corresponding to the motion of the three dimensional pointing device;

a modifying module including an angular velocity generating unit coupled to the angle calculating unit, and configured to receive the pointer signal from the angle calculating unit to generate an angular velocity of the three dimensional pointing device, a control unit coupled to the angular velocity generating unit and configured to receive the angular velocity from the angular velocity generating unit, the control unit being operable to generate a first control signal based on the angular velocity and predetermined angular velocity threshold information, and an adjustable low-pass filter coupled to the control unit and the angle calculating unit for receiving the first control signal and the pointer signal therefrom, the adjustable low-pass filter being operable with a gain range and determining a target gain based on the first control signal, the adjustable low-pass filter filtering the pointer signal with the target gain to output a modified output corresponding to the pointer signal; and a coordinate converting unit coupled to the adjustable low-pass filter for receiving the modified output therefrom, and converting the modified output into a pointing output having one of a two-axis coordinate and a three-axis coordinate, and associated with the motion of the three dimensional pointing device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
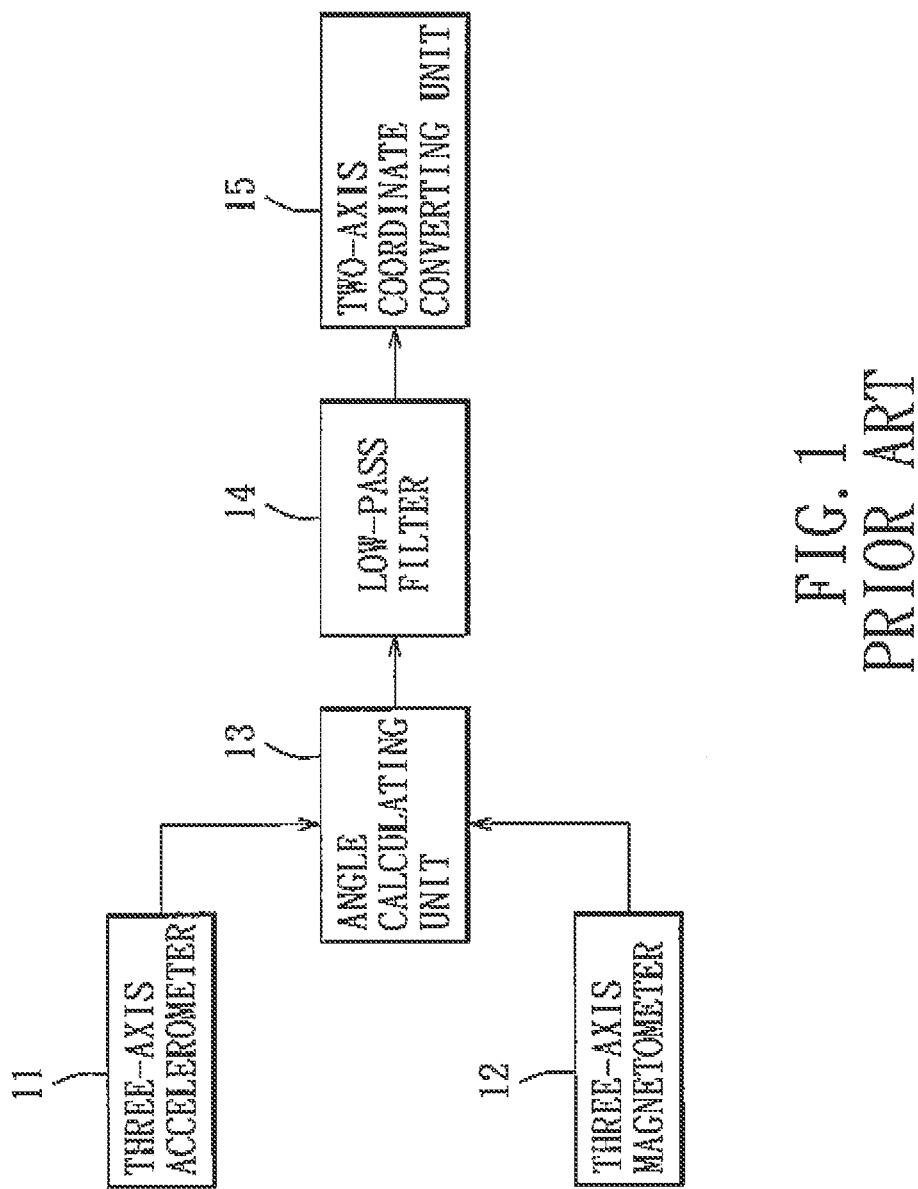
FIG. 1 is a schematic circuit block diagram illustrating a conventional three dimensional pointing device.
Figure 2:
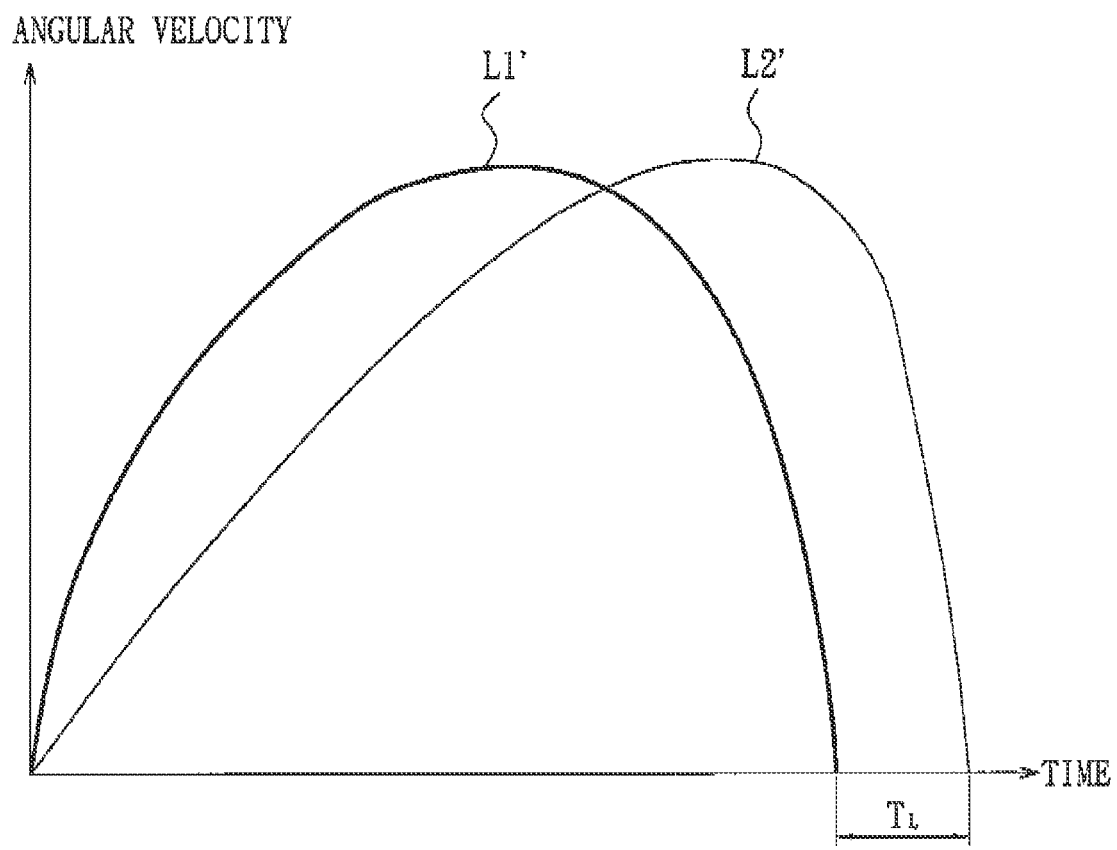
FIG. 2 is a plot illustrating an actual angular velocity of the conventional three dimensional pointing device and an angular velocity estimated by the conventional three dimension pointing device in one axis.
Figure 3:
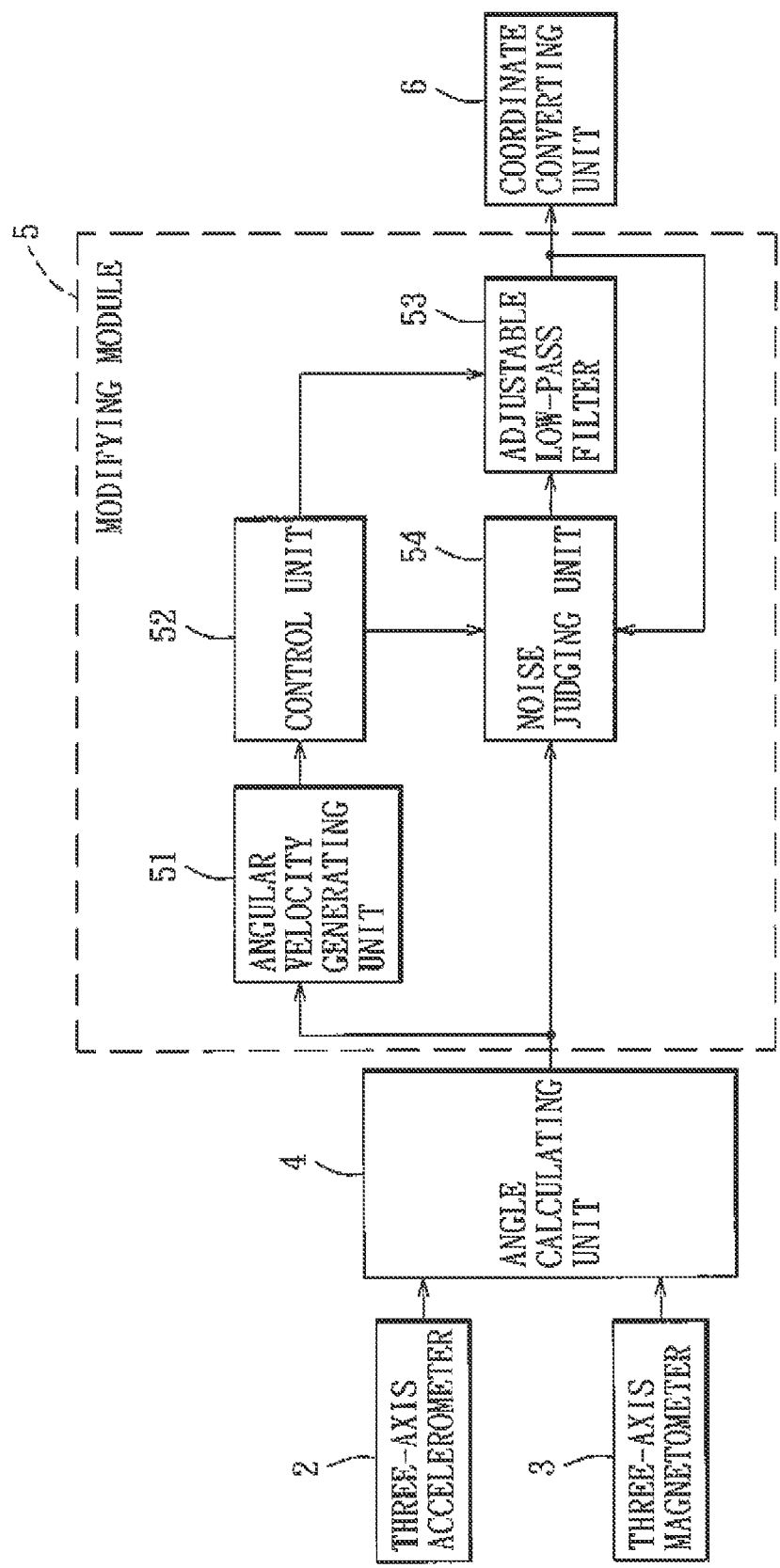
FIG. 3 is a schematic circuit block diagram illustrating the preferred embodiment of a three dimensional pointing device according to the present invention.

Referring to FIG. 3, the preferred embodiment of a three dimensional (3D) pointing device, such as a 3D mouse, a joystick or a remote controller, according to the present invention is shown to include a three-axis accelerometer 2, three-axis magnetometer 3, an angular calculating unit 4, a modifying module 5, and a coordinate converting unit 6.

The three-axis accelerometer 2 measures an acceleration value on an X-axis, a Y-axis and a 3-axis of the 3D pointing device during motion of the 3D pointing device to output an acceleration output.

The three-axis magnetometer 3 measures a terrestrial magnetism value on the X-axis, the Y-axis and Z-axis of the 3D pointing device during the motion of the 3D pointing device to output a terrestrial, magnetism output.

The angle calculating unit 4 is coupled to the accelerometer 2 and the magnetometer 3, and receives the acceleration output and the terrestrial magnetism output from the accelerometer 2 and the magnetometer 3 to output an angular pointer signal corresponding to the motion of the 3D pointing device Since the feature of this invention does not reside in the configuration of the accelerometer 2 the magnetometer 3 and the angle calculating unit 4, which is known to those skilled in the art, details of the same are omitted herein for the sake of brevity.

The modifying unit 5 is used to modify the pointer signal from the angle calculating unit 4 to generate a modified output corresponding to the pointer signal. The modifying unit 5 includes an angular velocity generating unit 51, a control unit 52, en adjustable low-pass filter 53, and a noise judging unit 54.

The angular velocity generating unit 51 is coupled to the angle circulating unit 4, and receives the pointer signal from the angle calculating unit 4 to generate an angular velocity of the 3D pointing device.

The control unit 52 is coupled to the angular velocity generating unit 51, and receives the angular velocity from the angular velocity generating unit 51. The control unit is operable to generate first and second control signals based on the angular velocity and predetermined angular velocity threshold information, in this embodiment, the control unit 52 stores the predetermined angular velocity threshold information that includes first and second accelerated angular velocity thresholds (Vhth1, Vhth2), and first and second decelerated angular velocity thresholds (Vlth1, Vlth2) corresponding respectively to the first and second accelerated angular velocity thresholds (Vhth1, Vhth2) where Vhth2>Vlth2>Vhth1>Vlth1. During incrementing of the angular velocity, the control unit 52 compares the angular velocity with one of the first and second accelerated angular velocity thresholds (Vhth1, Vhth2) and generates the first and second control signals based on the results of the comparison. Upon decrementing of the angular velocity, the control unit 52 compares the angular velocity with one of the first and second decelerated angular velocity thresholds (Vlth1, Vlth2) and generates the first and second control signals based on the results of the comparison.

The noise judging unit 54 is coupled to the angle calculating unit 4 and the control unit 52 for receiving the pointer signal and the second control signal. The noise judging unit 54 determines a target angle threshold based on the second control signal from the control unit 52 and predetermined angle threshold information, and judges, based on a reference angle signal and the target angle threshold, whether the pointer signal is noise. The noise judging unit 54 outputs the pointer signal upon judging that the pointer signal is not noise. In this embodiment, the noise judging unit 54 stores the predetermined angle threshold information that includes first, second and third angle thresholds (Thres1, Thres2, Thres3), and a decelerated angle threshold (Thres4), where Thres1>Thres2>Thres3>Thres4. The noise judging unit 54 selects, based on the second control signal received thereby, one of the first, second and third angle thresholds (Tbres1, Thres2, Thres3) and the decelerated angle threshold (Thres4) that serves as the target angle threshold. The noise judging unit 54 determines whether an angle difference between the pointer signal and the reference angle signal is greater than the target angle threshold. The noise judging unit 54 judges that the pointer signal is not noise when the angle difference between the pointer signal and the reference angle signal is greater than the target angle threshold.

The adjustable low-pass filter 53 is coupled to the control unit 52 and the noise judging unit 54, and receives the first control signal from the control unit 52 and the pointer signal output by the noise judging unit 54. In this embodiment, the adjustable low-pass filter 53 is operable with first, second, third and fourth gains (Gain1, Gain2, Gain3, Gain within a gain range, where Gain1<Gain2<Gain3<Gain4. The adjustable low-pass filter 53 determines a target gain based on the first control signal, and filters the pointer signal with the target gain to output the modified output corresponding to the pointer signal. In this embodiment, the modified output is fed back to the noise judging unit 54, and serves as the reference angle signal.

The coordinate converting unit 6 is coupled to the adjustable low-pass filter 53 for receiving the modified output. In this embodiment, the coordinate converting unit converts the modified output into a pointing output having one of two-axis coordinate and three-axis coordinate as required and associated with the motion of the 3D pointing device.

Figure 4:
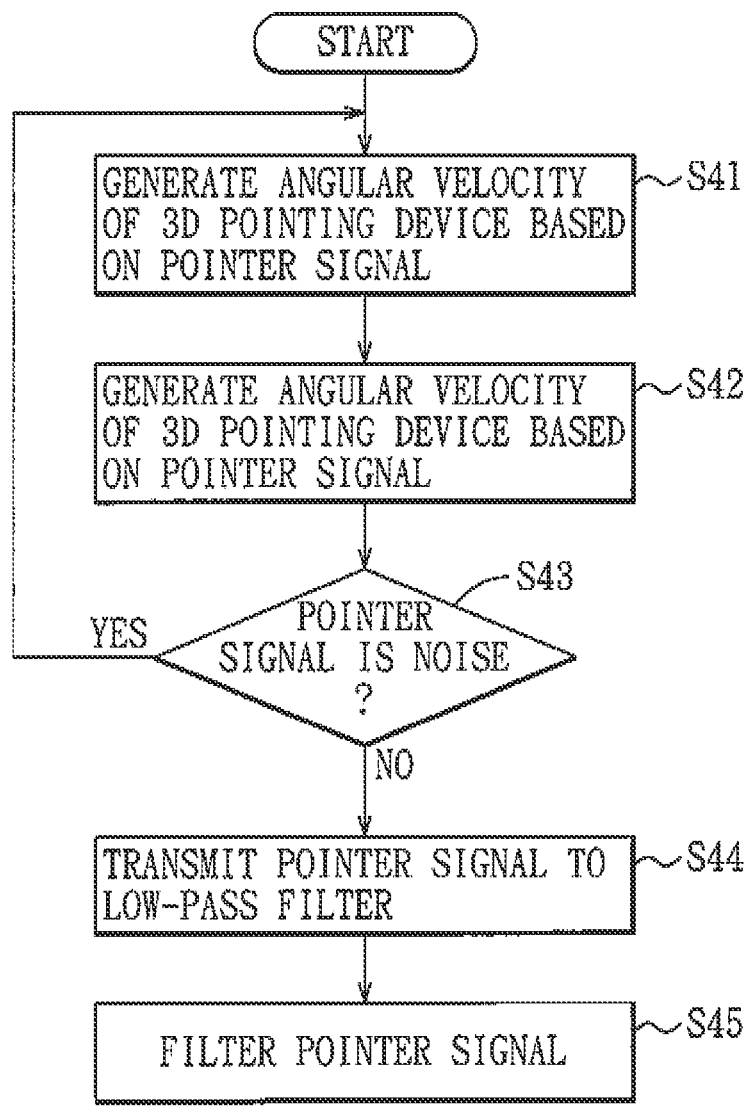
FIG. 4 is a flow chart illustrating a method of modifying the angular pointer signal from the angle calculating unit 3 performed by the modifying module 5.

FIG. 4 is a flow chart illustrating a method of modifying the angular pointer signal from the angle calculating unit 3 performed by the modifying module 5.

In step S41, the angular velocity generating unit 51 generates an angular velocity of the 3D pointing device based on the angular pointer signal from the angle calculating unit 4.

In step S42, the control unit 52 compares the angular velocity with the predetermined angular velocity threshold information to generate the first and second control signals based on the results of the comparison such that the adjustable low-pass filter 53 determines the target gain based on the first control signal and such that the noise judging unit 54 determines the target angle threshold.

In step S43, the noise judging unit 54 judges whether the pointer signal is noise based on the target angle threshold and the reference angle signal. If the result is negative, the flow proceeds to step S44. Otherwise, the flow goes back to step S41.

In step S44, the noise judging unit 54 transmits the pointer signal to the adjustable low-pass filter 53.

In step S45, the adjustable low-pass filter 53 filters the pointer signal with the target gain determined in step S42 to output the modified output.

Figure 5:
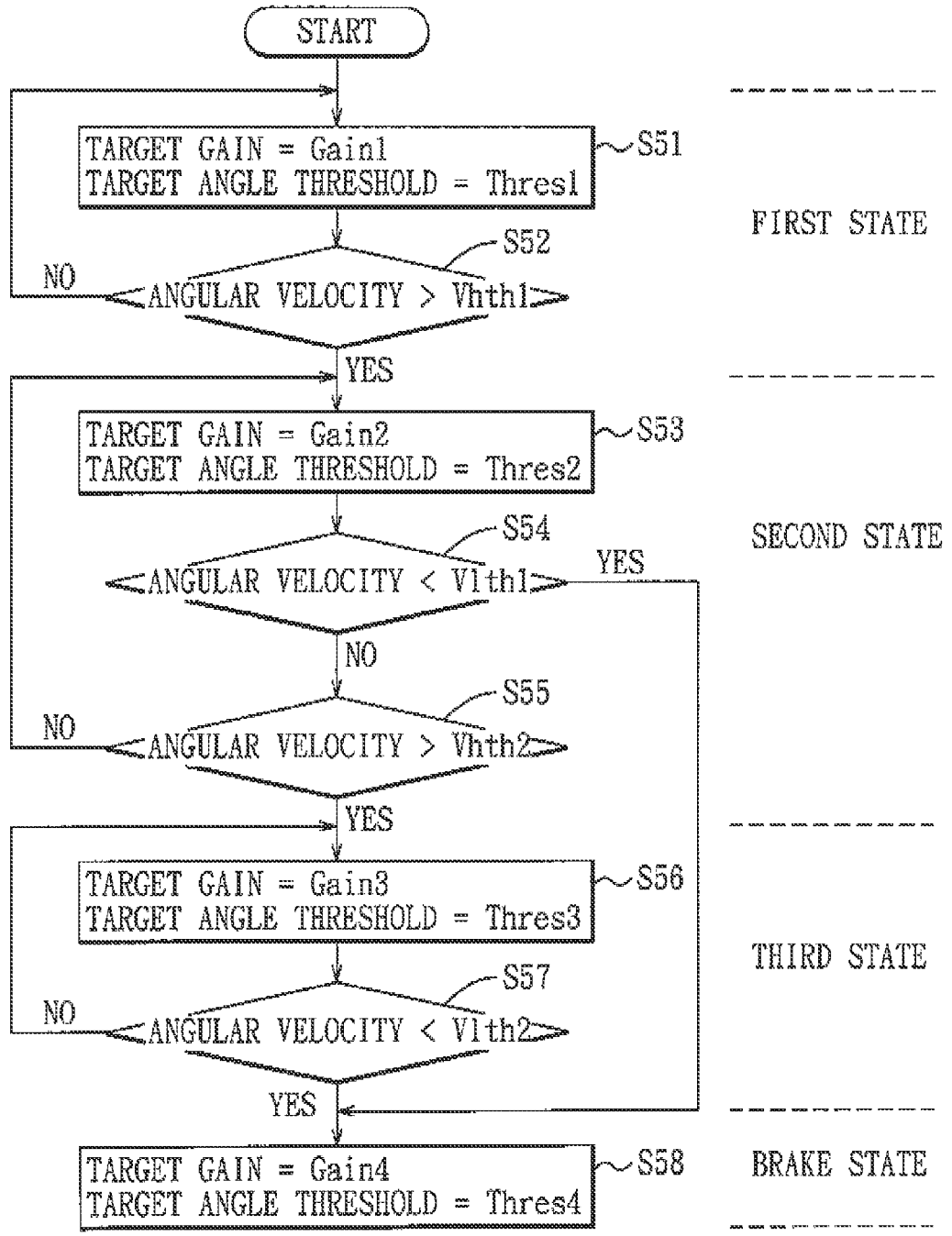
FIG. 5 is a flow chart illustrating how the modifying module of the preferred embodiment determines a target gain of an adjustable low-pass filter and a target, angle threshold for a noise judging unit during one operation.

FIG. 5 is a flow chart illustrating how the modifying module 5 determines the target gain of the adjustable low-pass filter 53 and the target angle threshold for the noise judging unit 54 during one operation.

In step S51, initially, the target gain of the adjustable low-pass filter 53 is preset to the first gain (Gain1), and the target angle threshold is preset to the first angle threshold (Thres1).

In step S52, the control unit 52 determines whether the angular velocity is greater than the first accelerated angular velocity threshold (Vhth1). If the result is affirmative, the flow goes to step S53. Otherwise, the flow goes back to step S51. In other words, when the angular velocity is not greater than the first accelerated angular velocity, the target gain is maintained at the first gain (Gain1), and the target angle threshold is maintained at the first angle threshold (Thres1).

In step S53, the adjustable low-pass filter 53 increases the target gain from the first gain (Gain1) to a second gain (Gain2) in response to the first control signal from the control unit 52. The noise judging unit 54 decreases the target angle threshold from the first angle threshold (Thres1) to the second angle threshold (Thres2) in response to the second control signal from the control unit 52.

In step S54, the control unit 52 determines whether the angular velocity is less than the first decelerated angular velocity threshold (Vlth1). If the result is negative the flow goes to step S55. Otherwise, the flow proceeds to step S58. In other words, if the angular velocity is less than the first decelerated angular velocity threshold (Vlth1), then the motion of the 3D pointing device is slow.

In step S55, the control unit 52 determines whether the angular velocity is greater than the second accelerated angular velocity threshold (Vhth2). If the result is affirmative, the flow goes to step S56. Otherwise, the flow goes back to step S53. In other words, when the angular velocity is not greater than the second accelerated angular velocity threshold (Vhth2), the target gain is maintained at the second gain (Gain2), and the target angle threshold is maintained at the second angle threshold (Thres2).

In step S56, the adjustable low-pass filter 53 increases the target gain from the second gain (Gain2) to the third gain (Gain3) in response to the first control signal from the control unit 52. The noise judging unit 54 decreases the target angle threshold from the second angle threshold (Thres2) to the third angle threshold (Thres3) in response to the second control signal from the control unit 52.

In step S57, the control unit 52 determines whether the angular velocity is less than the second decelerated angular velocity threshold (Vlth2). If the result is affirmative, the flow goes to step S58. Otherwise, the flow goes back to step S56. In other words, if the angular velocity is less than the second decelerated angular velocity threshold (Vlth2), then the motion of the 3D pointing device is slow.

In step S58, the adjustable low-pass filter 53 increases the target gain from the third gain (Gain3) to the fourth gain (Gain4) in response to the first control signal from the control unit 52. The noise judging unit 54 decreases the target angle threshold from the third angle threshold (Thres3) to the decelerated angle threshold (Thres4) in response to the second control signal from the control unit 52.

When the flow is within a loop that includes step S51 and step S52, the modifying module 5 is operated at a first state. When the flow is within a loop that includes step S53, step S54 and step S55, the modifying module 5 is operated at a second state. When the flow is within a loop that includes step S56 and step S57, the modifying module is operated at a third state. When the flow is at step S58, the modifying module 5 is operated at a brake state.

Figure 6:
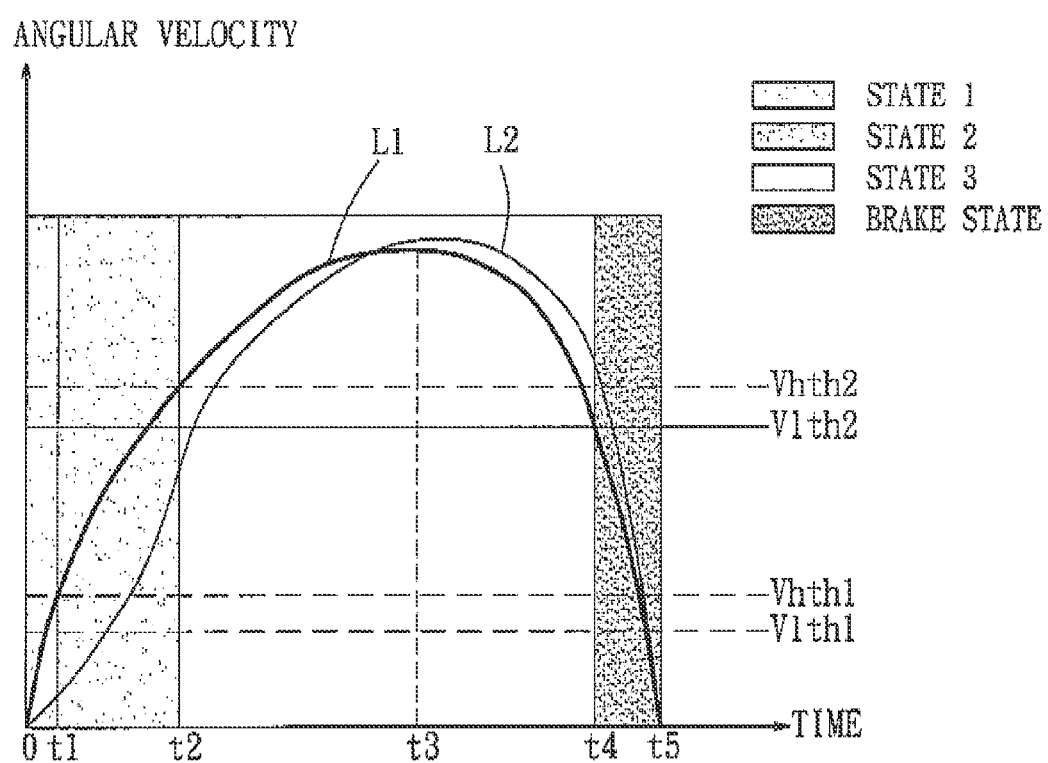
FIG. 6 is a plot illustrating the relationship between an angular velocity of the three dimensional pointing device and a modified angular velocity obtained from the preferred embodiment in one axis during one operation.

FIG. 6 illustrates the relationship between an angular velocity (L1) of the three dimensional pointing device and a modified angular velocity (L2) obtained from the preferred embodiment in one axis during one operation. During a period from 0 to t1, the angular velocity (L1) is not greater than the first accelerated angular velocity threshold (Vhth1) such that the modifying module 5 is operated at the first state. During a period from t1 to t2, the angular velocity (L1) is greater than the first accelerated angular velocity threshold (Vhth1), and is not greater than the second accelerated angular velocity threshold (Vhth2) such that the modifying module 5 is operated at the second state. During a period from t2 to t3, the angular velocity (L1) increases and is greater than the second accelerated angular velocity threshold (Vhth2) such that the modifying module 5 is operated at the third state. During a period from t3 to t4, the angular velocity (L1) decreases and is greater than the second decelerated angular velocity threshold (Vlth2) such that the modifying module 5 is operated at the third state. During a period from t4 to t5, the angular velocity (L1) decreases from the second decelerated angular velocity threshold (Vlth2) to zero, i.e., the angular velocity (L1) is not greater than the second decelerated angular velocity threshold (Vlth2), such that the modifying module 5 is operated at the brake state. It is noted that the modifying module 5 almost reduces a latency time to zero. Therefore, the 3D pointing device of the present invention can instantaneously generate a pointing output in response to one operation.

In sum, because the modifying module 5 can appropriately determine the target gain of the adjustable low-pass filter 53, the 3D pointing device of the present invention can precisely generate a pointing output corresponding to motion of the 3D pointing device even though the motion is high-speed motion. In addition, the 3D pointing device of the present invention can instantaneously generate pointing output in response to one operation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of modifying a pointer signal generated by a handheld pointing device using three dimensional pointing and corresponding to motion of the handheld pointing device, said method comprising the steps of:
   a) providing an adjustable low-pass filter operable within a gain range;
   b) generating an angular velocity of the pointing device based on the pointer signal;
   c) determining a target gain of the adjustable low-pass filter based on the angular velocity and predetermined angular velocity threshold information; and
   d) filtering the pointer signal using the adjustable low-pass filter with the target gain determined in step c) to generate a modified output corresponding to the pointer signal;
   wherein the predetermined angular velocity threshold information includes at least one accelerated angular velocity threshold and at least one decelerated angular velocity threshold corresponding to and less than the accelerated angular velocity threshold; and
   wherein step c) includes the sub-steps of
   c-1) during incrementing of the angular velocity, determining whether the angular velocity is greater than the accelerated angular velocity threshold,
   c-2) increasing the target gain of the adjustable low-pass filter from a first gain to a second gain that corresponds to the accelerated angular velocity threshold when, in sub-step c-1), the angular velocity is greater than the accelerated angular velocity threshold, the first and second gains being within the gain range,
   c-3) maintaining the target gain of the adjustable low-pass filter at the first gain when, in sub-step c-1), the angular velocity is not greater than the accelerated angular velocity threshold,
   c-4) upon decrementing of the angular velocity, determining whether the angular velocity is less than the decelerated angular velocity threshold, and
   c-5) increasing the target gain of the adjustable low-pass filter from the first gain to a decelerated gain that is greater than the second gain and is within the gain range when the angular velocity is less than the decelerated angular velocity threshold in sub-step c-4).

2. The method as claimed in claim 1, prior to step d), further comprising the steps of:
   d-1) judging, based on predetermined angle threshold information and a reference angle signal, whether the pointer signal is noise; and
   d-2) when the pointer signal is not noise in step d-1), transmitting the pointer signal to the adjustable low-pass filter.

3. The method as claimed in claim 2, wherein the predetermined angle threshold information includes at least first and second angle thresholds, and a decelerated angle threshold less than the first and second angle thresholds, the first angle threshold being greater than the second angle threshold, step d-1) further including the sub-steps of:
   d-11) selecting one of the first and second angle thresholds and a decelerated angle threshold that serves as a target angle threshold;
   d-12) determining whether an angle difference between the pointer signal and the reference angle signal is greater than the target angle threshold, and judging that the pointer signal is not noise when an difference between the pointer signal and the reference angle signal is greater than the target angle threshold.

4. The method as claimed in claim 3, wherein, in sub-step d-11):
   when the angular velocity is not greater than the accelerated angular velocity threshold in sub-step c-1), the first angle threshold is selected as the target angle threshold;
   when the angular velocity is greater than the accelerated angular velocity threshold in sub-step c-1), the second angle threshold is selected as the target angle threshold; and
   when the angular velocity is less than the decelerated angular velocity threshold in sub-step c-4), the decelerated angle threshold is selected as the target angle threshold.

5. A module for modifying an angular pointer signal generated by a handheld pointing device using three dimensional pointing and corresponding to motion of the handheld pointing device, said module comprising:
   an angular velocity generating unit adapted for receiving the pointer signal from the handheld pointing device to generate an angular velocity of the pointing device;
   a control unit coupled to said angular velocity generating unit and receiving the angular velocity from said angular velocity generating unit, said control unit being operable to generate a first control signal based on the angular velocity and predetermined angular velocity threshold information; and
   an adjustable low-pass filter coupled to said control unit for receiving the first control signal, and adapted to receive the pointer signal from the pointing device, said adjustable low-pass filter being operable with a gain range and determining a target gain based on the first control signal, said adjustable low-pass filter filtering the pointer signal with the target gain to output a modified output corresponding to the pointer signal; wherein:
   said control unit stores the predetermined angular velocity threshold information that includes at least one accelerated angular velocity threshold;
   said control unit compares the angular velocity with the accelerated angular velocity during incrementing of the angular velocity, and generates the first control signal based on the results of the comparison;
   said adjustable low-pass filter is operable with at least first and second gains within the gain range, the second gain being greater than the first gain;
   when the first control signal generated by said control unit indicates that the angular velocity is not greater than the accelerated angular velocity threshold during incrementing of the angular velocity, said adjustable low-pass filter changes the target gain to the first gain;
   when the first control signal generated by said control unit indicates that the angular velocity is greater than the accelerated angular velocity threshold during incrementing of the angular velocity, said adjustable low-pass filter changes the target gain to the second gain;
   the predetermined angular velocity threshold information further includes at least one decelerated angular velocity threshold corresponding to and less than the accelerated angular velocity threshold;
   said control unit compares the angular velocity received thereby with the decelerated angular velocity threshold upon decrementing of the angular velocity, and generates the first control signal based on the results of the comparison;

said adjustable low-pass filter is operable with a decelerated gain that is within the gain range and that is greater than the second gain; and when the first control signal generated by said control unit indicates that the angular velocity is less than the decelerated angular velocity threshold upon decrementing of the angular velocity, said adjustable low-pass filter changes the target gain to the decelerated gain.

6. The module as claimed in claim 5, wherein said control unit is operable to generate a second control signal based on the pointer signal and the predetermined angular velocity threshold information;

said module further comprising a noise judging unit coupled to said control unit and said adjustable low-pass filter and receiving the second control signal from said control unit, said noise judging unit being adapted to receive the pointer signal from the pointing device, said noise judging unit determining a target angle threshold based on the second control signal from the control unit and predetermined angle threshold information, and judging, based on a reference angle signal and the target angle threshold, whether the pointer signal is noise, said noise judging unit transmitting the pointer signal to said adjustable low-pass filter upon judging that the pointer signal is not noise.

7. The module as claimed in claim 6, wherein:

said noise judging unit stores therein the predetermined angle threshold information that includes at least first and second angle thresholds, and a decelerated angle threshold less than the first and second angle thresholds, the first angle threshold being greater than the second angle threshold;

said noise judging unit selects, based on the second control signal, one of the first and second angle thresholds and the decelerated angle threshold that serves as the target angle threshold;

said noise judging unit determines whether an angle difference between the pointer signal and the reference angle signal is greater than the target angle threshold; and said noise judging unit judges that the pointer signal is not noise when the angle difference between the pointer signal and the reference angle signal is greater than the target angle threshold.

8. The module as claimed in claim 7, wherein:

when the second control signal from said control unit indicates that the angular velocity is not greater than the accelerated angular velocity threshold during incrementing of the angular velocity, said noise judging unit selects the first angle threshold as the target angle threshold;

when the second control signal from said control unit indicates that the angular velocity is greater than the accelerated angular velocity threshold during incrementing of the angular velocity, said noise judging unit selects the second angle threshold as the target angle threshold; and when the second control signal from said control unit indicates that the angular velocity is less than the decelerated angular velocity threshold upon decrementing of the angular velocity, said noise judging unit selects the decelerated angle threshold as the target angle threshold.

9. The module as claimed in claim 6, wherein the modified output generated by said adjustable low-pass filter is fed back to said noise judging unit, and serves as the reference angle signal.

10. A three dimensional pointing device comprising:

a three-axis accelerometer for measuring a three dimensional acceleration value of said three dimensional during motion of said three dimensional pointing device to output an acceleration output;

a three-axis magnetometer for measuring a three dimensional terrestrial magnetism value of said three dimensional during the motion of said three dimensional pointing device to output a terrestrial magnetism output;

an angle calculating unit coupled to said accelerometer and said magnetometer, and configured to receive the acceleration output and the terrestrial magnetism output from said accelerometer and said magnetometer to output an angular pointer signal corresponding to the motion of said three dimensional pointing device;

a modifying module including
an angular velocity generating unit coupled to said angle calculating unit, and configured to receive the pointer signal from said angle calculating unit to generate an angular velocity of said three dimensional pointing device,
a control unit coupled to said angular velocity generating unit and configured to receive the angular velocity from said angular velocity generating unit, said control unit being operable to generate a first control signal based on the angular velocity and predetermined angular velocity threshold information, and
an adjustable low-pass filter coupled to said control unit and said angle calculating unit for receiving the first control signal and the pointer signal, said adjustable low-pass filter being operable with a gain range and determining a target gain based on the first control signal, said adjustable low-pass filter filtering the pointer signal with the target gain to output a modified output corresponding to the pointer signal; and
a coordinate converting unit coupled to said adjustable low-pass filter for receiving the modified output, and converting the modified output received thereby into a pointing output having one of a two-axis coordinate and a three-axis coordinate, and associated with the motion of said three dimensional pointing device;
wherein:

said control unit stores the predetermined angular velocity threshold information that includes at least one accelerated angular velocity threshold;

said control unit compares the angular velocity with the accelerated angular velocity during incrementing of the angular velocity, and generates the first control signal based on the results of the comparison;

said adjustable low-pass filter of said modifying module is operable with at least first and second gains within the gain range, the second gain being greater than the first gain;

when the first control signal generated by said control unit indicates that the angular velocity is not greater than the accelerated angular velocity threshold during incrementing of the angular velocity, said adjustable low-pass filter changes the target gain to the first gain;

when the first control signal generated by said control unit indicates that the angular velocity is greater than the accelerated angular velocity threshold during incrementing of the angular velocity, said adjustable low-pass filter changes the target gain to the second gain;

the predetermined angular velocity threshold information further includes at least one decelerated angular velocity threshold corresponding to and less than the accelerated angular velocity threshold;

said control unit compares the angular velocity received thereby with the decelerated angular velocity threshold upon decrementing of the angular velocity, and generates the first control signal based on the results of the comparison;

said adjustable low-pass filter is operable with a decelerated gain that is within the gain range and that is greater than the second gain; and when the first control signal generated by said control unit indicates that the angular velocity is less than the decelerated angular velocity threshold upon decrementing of the angular velocity, said adjustable low-pass filter changes the target gain to the decelerated gain.

11. The three dimensional pointing device as claimed in claim 10, wherein:

said control unit is operable to generate a second control signal based on the pointer signal and the predetermined angular velocity threshold information;

said modifying module further includes a noise judging unit coupled to said angle calculating unit, said control unit and said adjustable low-pass filter, and receiving the pointer signal from said angle calculating unit and the second control signal from said control unit, said noise judging unit determining a target angle threshold based on the second control signal from the control unit and predetermined angle threshold information, and judging, based on a reference angle signal and the target angle threshold, whether the pointer signal is noise, said noise judging unit transmitting the pointer signal to said adjustable low-pass filter upon judging that the pointer signal is not noise.

12. The three dimensional pointing device as claimed in claim 11, wherein:

said noise judging unit stores therein the predetermined angle threshold information that includes at least first and second angle thresholds, and a decelerated angle threshold less than the first and second angle thresholds, the first angle threshold being greater than the second angle threshold;

said noise judging unit selects, based on the second control signal, one of the first and second angle thresholds and the decelerated angle threshold that serves as the target angle threshold;

said noise judging unit determines whether an angle difference between the pointer signal and the reference angle signal is greater than the target angle threshold; and said noise judging unit judges that the pointer signal is not noise when the angle difference between the pointer signal and the reference angle signal is greater than the target angle threshold.

13. The three dimensional pointing device as claimed in claim 12, wherein:

when the second control signal from said control unit indicates that the angular velocity is not greater than the accelerated angular velocity threshold during incrementing of the angular velocity, said noise judging unit selects the first angle threshold as the target angle threshold;

when the second control signal from said control unit indicates that the angular velocity is greater than the accelerated angular velocity threshold during incrementing of the angular velocity, said noise judging unit selects the second angle threshold as the target angle threshold; and when the second control signal from said control unit indicates that the angular velocity is less than the decelerated angular velocity threshold upon decrementing of the angular velocity, said noise judging unit selects the decelerated angle threshold as the target angle threshold.

14. The module as claimed in claim 11, wherein the modified output generated by said adjustable low-pass filter is fed back to said noise judging unit, and serves as the reference angle signal.

* * * * *